(12) United States Patent
Epshtein et al.

(10) Patent No.: US 8,060,302 B2
(45) Date of Patent: Nov. 15, 2011

(54) VISUAL ASSESSMENT OF LANDMARKS

(75) Inventors: Boris Epshtein, Bothel, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 12/416,115

(22) Filed: Mar. 31, 2009

(65) Prior Publication Data

US 2010/0250126 A1 Sep. 30, 2010

(51) Int. Cl.
*G01C 21/32* (2006.01)

(52) U.S. Cl. ........................................ 701/209

(58) Field of Classification Search .............. 701/2, 201, 701/207, 209
See application file for complete search history.

(56) References Cited

U.S. PATENT DOCUMENTS

| | | | |
|---|---|---|---|
| 7,171,046 | B2 | 1/2007 | Myers et al. |
| 7,831,542 | B2 * | 11/2010 | Milov ........................... 707/602 |
| 7,916,972 | B2 * | 3/2011 | Meunier ....................... 382/291 |
| 2006/0244830 | A1 | 11/2006 | Davenport et al. |
| 2007/0016368 | A1 | 1/2007 | Chapin et al. |
| 2007/0078596 | A1 | 4/2007 | Grace |
| 2007/0288452 | A1 * | 12/2007 | Podilchuk ........................ 707/5 |
| 2007/0299607 | A1 | 12/2007 | Cubillo |
| 2008/0025608 | A1 * | 1/2008 | Meunier ....................... 382/181 |
| 2008/0273795 | A1 | 11/2008 | Ofek et al. |
| 2008/0285886 | A1 | 11/2008 | Allen |
| 2008/0319659 | A1 | 12/2008 | Horvitz et al. |
| 2008/0319660 | A1 | 12/2008 | Horvitz et al. |
| 2009/0271386 | A1 * | 10/2009 | Milov .............................. 707/5 |

OTHER PUBLICATIONS

Zingaretti, et al., "Learning to Acquire and Select Useful Landmarks for Route Following", retrieved at http://ieeexplore.ieee.org/stamp/stamp.jsp?arnumber=827636&isnumber=17915, IEEE, 1999, pp. 161-168.

Fleischer, et al., "Learning to Autonomously Select Landmarks for Navigation and Communication", retrieved at <<http://citeseerx.istpsu.edu/viewdoc/summary?doi=10.1.1.18.7702, ICSAB: Proceedings of the seventh international conference on simulation of adaptive behavior on From animals to animats, 2002, 10 pages, MIT Press, Cambridge, Mass.

Raubal, et al., "Enriching Wayfinding Instructions with Local Landmarks", retrieved at <<ftp://ftp.geoinfo.tuwien.ac.at/winter/raubal02enriching.pdf>>, GIScience '02: Proceedings of the Second International Conference on Geographic Information Science, 2002, 18 pages, Springer-Verlag, London, U.K.

* cited by examiner

*Primary Examiner* — Gerald J. O'Connor
*Assistant Examiner* — Edward Winston, III

(57) ABSTRACT

Visual images may be used to detect, or verify the existence of, landmarks. In one example, the landmarks may be used to provide driving or walking directions. A set of records may be examined to identify the street addresses of businesses or other entities. Additionally, street-level images may be captured with a camera, and the locations at which the images were captured may be recorded. The images may be evaluated with an Optical Character Recognition (OCR) process to determine what words appear in the images. The words in the image are compared with the names of entities whose addresses are near where the image was captured. If the words match the entity name, then a sign identifying the entity is presumed to be visible along a particular route, and the entity may be used as a landmark in a set of walking or driving directions.

17 Claims, 7 Drawing Sheets

VISUAL ASSESSMENT OF LANDMARKS

BACKGROUND

Many map applications provide the ability to give directions. Examples of map applications include web-based map applications (e.g., Live Search Maps, Google Maps, MapQuest, etc.) and navigation devices. Typically, these map applications give directions in the form of lists of intersections at which a user is to change direction. For example, directions might say, "Proceed for 1.5 miles, and then turn right on Main Street." Map applications typically provide text (or spoken) directions, along with a map of the intersection at which the change of direction is to take place. For example, when the directions call for a turn at the intersection of Main Street and Elm Street, an automobile navigation device may display a map of that intersection near the time when the user is approaching the turn.

Directions provided by map applications are sometime difficult to follow. Maps are schematic representations of roads, and some people are not adept at relating these abstractions to an actual road. Moreover, sometimes the map displayed by the application does not correspond well with the actual road that the application is trying to show. For example, some highway intersections, or street crossings at oblique angles, may not appear in real life as they do on a map. Additionally, in some areas street signs are not easily visible, and the building-numbering scheme may be unclear or inconsistent, which also can make directions difficult to follow.

SUMMARY

Landmarks may be identified from visual images, and the landmarks may be used to provide directions. One type of landmark that may exist on a road is a large or well-known business with visible signage. Businesses are typically listed in directories that exist in digital form. The name and location of these businesses may be collected from these directories. Directories often provide a street address from which the approximate, but not exact, location of the business can be determined. Even if a business exists in the exact location indicated by its street address, the business may or may not be a visible landmark.

In order to assess a business's viability as a landmark, visual images taken in the vicinity of the business may be evaluated to confirm or refute a business's existence and/or visibility. The images may also be used to assess, in various ways, how well the business functions as a landmark. Images may be taken, for example, by a camera attached to a car, where the location at which an image is taken is recorded along with the image. For a given business, images taken in the vicinity of the business are examined. Optical character recognition (OCR) may be performed on the images to determine what words appear in the image. Images that are found to contain signs whose wording is consistent with the name and location of the business, as listed in the directory, are treated as confirmation of the existence of the business. The fact that an image showing the business's name is captured in the vicinity where the directory states the business is located is considered a strong indication that the business is a viable landmark. The locations of such landmarks are stored, and the landmarks may be used to provide directions.

Thus, directions may be given in a form such as, "Turn right on Main Street. There is an Exxon gas station at the corner of Main Street." In this example, the Exxon station may be a landmark that was obtained from a business directory, and techniques described herein may be used to confirm that the Exxon station listed in the directory exists at a particular location and is sufficiently visible to use as a landmark.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
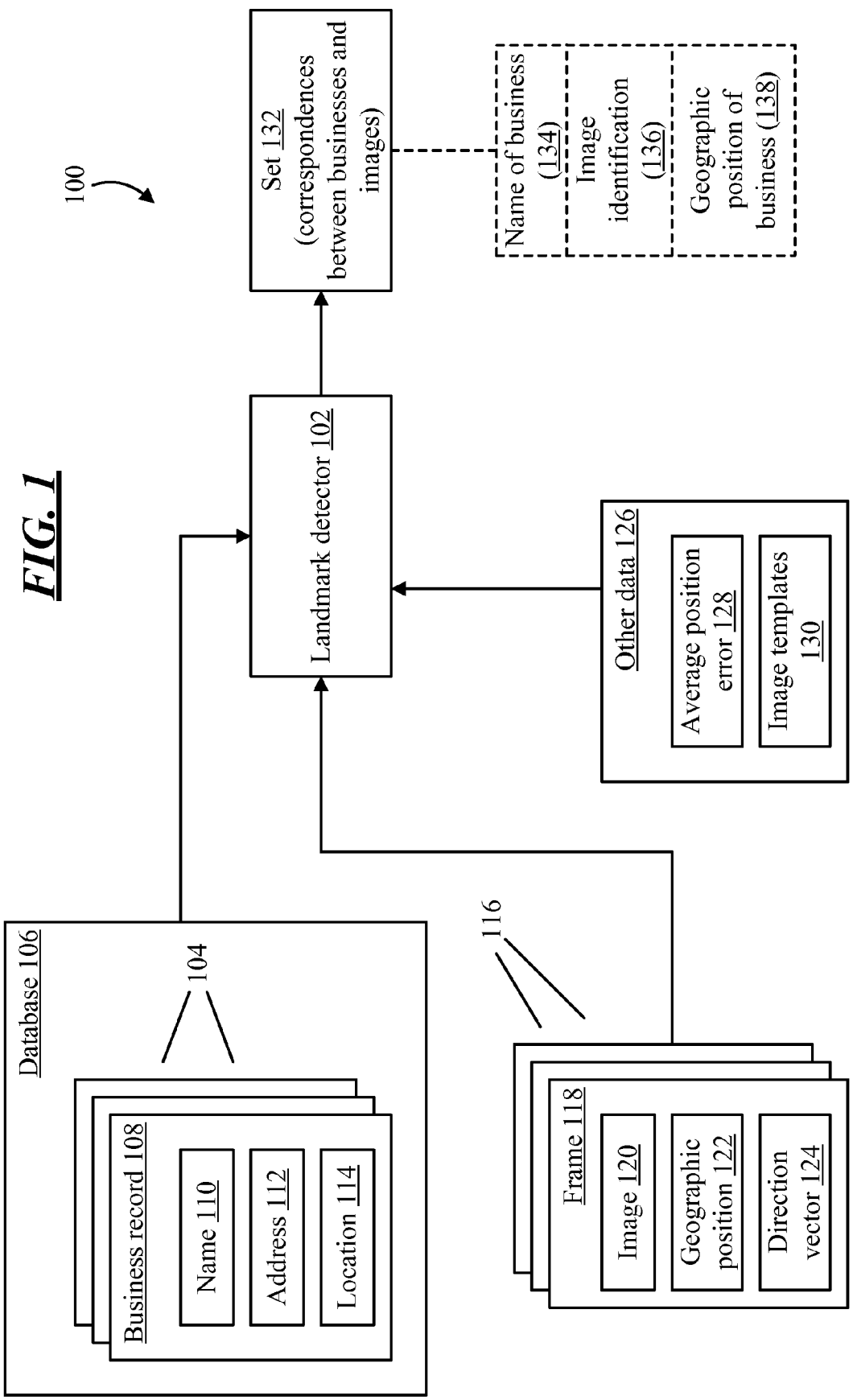
FIG. 1 is a block diagram of an example system that may be used to detect and discover landmarks.

Various navigation applications are available to provide directions for driving, walking, or other modes of travel. Web sites offer map applications that allow a user to request directions from one point to another. Navigation devices based on Global Positioning System (GPS) technology have become common, and these systems are often used to provide directions to drivers, walkers, cyclists, etc. Directions typically take the form of a list of instructions, where each of the instructions describes a turn to be made (or not made) at a particular intersection.

Sometimes, directions are difficult to follow. For example, the directions might say, "turn right on Main Street." However, it might be difficult for a traveler to identify Main Street. The street sign might be missing, or the Main Street intersection might be confusing (e.g., if several roads intersect the traveler's current road very near to each other).

One way to provide directions that are easy to follow is to identify landmarks along a route and at decision points. For example, if a driver knows that there is a particular brand of gas station, or a particular chain restaurant, at the Main Street intersection, then the intersection may be easier to find. If the directions include a long stretch of road without a turn, then a driver may become concerned that he or she has missed a turn. Identifying landmarks along such a stretch of road may give the driver confidence that he or she is still on the correct route.

However, in order to provide landmarks as part of directions, there has to be a source of information that identifies where the landmarks are. Various business directories are available, which identify the street address of businesses. So, if a navigation application wants to provide a user with a landmark at a particular intersection, it could look up, in a business directory, what businesses are located near that intersection, and could include the name of the business in the directions. (E.g., "There is an Exxon gas station just before the Main Street intersection; turn right after the gas station.") However, some businesses listed in a directory do not make good landmarks. For example, street addresses can be used to infer approximate, but not exact, locations of businesses, so a business might not be in exactly the location that the address indicates. Even if the business is in the location indicated by its address, it might not be visible, and thus might not make an effective landmark. View of the business might be occluded by vegetation, buildings, etc. Or, the business might be in an indoor shopping mall, and thus might not be visible from the road. Or, as another example, there might be many businesses in a small space, so it might be difficult for a driver to discern any one of the businesses as a landmark.

The subject matter herein may be used to provide visual confirmation and assessment of landmarks, so that the landmarks can be used in providing directions. Images taken at street level are evaluated with an Optical Character Recognition (OCR) algorithm to identify words that appear in the images. A business directory is then used to find the names and apparent locations of businesses, and images captured in the vicinity of the business are compared with the business directory. If the words appearing in the image appear to match the name of a business in the directory, this fact tends to indicates that a sign with the business's name is visible from the road, which means that the business is a viable landmark. Similarly, a business logo could be recognized in an image, and the presence of such a logo in the image tends to show that the landmark is visible from the road. Landmarks may be assessed for relative quality. E.g., landmarks that are particularly visible and discernible (as indicated by the image data), and that are located at places that may be significant to drivers (e.g., intersections) may be considered relatively high value landmarks. Landmarks that are not easily discernible, or that are marked by small signs, or that are not located near intersections, may be considered relatively low value landmarks. The quality of the landmark could depend on the purpose for which the landmark will be used—e.g., small signs might be acceptable for low-speed activities such as walking or cycling, but might be unacceptable (or less acceptable) for automobile directions. Information about the existence, visibility, and quality of landmarks may be used by a navigation algorithm to choose landmarks that are to be incorporated into a set of directions.

Turning now to the drawings, FIG. 1 shows an example system 100 that may be used to detect and discover landmarks. Landmark detector 102 is a component that receives various types of input from which the existence and quality of landmarks may be mined. Landmark detector 102 may take any form, such as, for example, a machine that processes various inputs, software that runs on a computer or other appropriate machine, or some combination thereof.

Various types of input may be provided to landmark detector 102. One example of such input is a set of business records 104. Business records 104 may be part of a directory, such as the telephone directory, or a commercially-available business directory. Business records 104 may be stored, for example, in database 106. Business record 108 is an example of the kind of record that may be included among business records 104. Business record 108 may store a name 110 of a given business, a street address 112 of that business, and/or a physical location 114 of the business (e.g., latitude and longitude coordinates, if known). The information that is shown as being part of business record 108 is an example, although a business record could store additional fields of information, or could store less information than is shown in FIG. 1. For example, a business record might store the name and street address of a business, but not the latitude and longitude coordinates of the business's physical location.

Another example of the input that may be provided to landmark detector 102 is image frames 116. Image frames 116 may contain images that are captured by an image-capture device, such as a camera. In FIG. 1, frame 118 shows an example of the type of information that may be stored one of image frames 116. Frame 118, in this example, includes an image 120 in some format (e.g., a bitmap file, a Joint Photographic Experts Group (JPEG) file, etc.), a geographic position 122 from which the image was captured, and a direction vector 124 indicating the orientation of the image-capture device at the time the image was captured. For example, at the time a given image is captured, the camera that captured the image may have been located at 40° N latitude and 75° W longitude, and the camera may have been pointing in direction defined by a compass heading of 45° (i.e., directly northeast). This type of information may be captured in geographic position 122 and direction vector 124, and it may aid landmark detector 102 in determining the location of items that appear in image 120. As is the case with business records 104, the type of information shown in frame 118 is merely an example; a frame could contain additional information beyond what is shown in FIG. 1, or could contain less information than is shown in FIG. 1.

In addition to business records 104 and image frames 116, landmark detector 102 could also receive other data 126 as input. For example, other data 126 may include the average position error 128 in the locations of business identified in business records 104. For example, actual locations can be inferred from street addresses, but since street numbers are assigned based on approximate (but not exact) linear distance along a street, empirical analysis may indicate some average divergence between a business's location as indicated by its address, and the business's actual location. Average position error 128 may indicate a typical value for this divergence, so that landmark detector 102 can take the divergence into account when interpreting the locations of objects shown in image frames 116.

Another example of other data 126 is image templates 130. Many types of businesses that might be listed in business records 104, or that might be shown in image frames 116, have appearances that conform to certain characteristics. For example, McDonald's restaurants, Exxon gas stations, 7-11 convenience stores, etc. display certain types of signage that includes certain symbols (e.g., the "golden arches" at McDonalds), or certain color schemes (e.g., McDonald's restaurants often feature particular shades of red and yellow). Image templates might be used to recognizes, or confirm the existence of, certain well-known businesses in images frames 116.

Average position error 128 and image templates 130 are examples of other data 126 that landmark detector 102 might use in detecting landmarks. However, any type of information could be provided to landmark detector 102.

Landmark detector 102 evaluates the information that it receives and produces a set 132 of correspondences between business and images. Thus, if a business appears in an image, set 132 may indicate a correspondence between the image and the business. Each member of set 132 may, for example, indicate the name 134 of a business, an identification 136 of a particular image in which landmark detector 102 observed the business, and a geographic position 138 of the business (which landmark detector 102 might infer based on factors such as the business's street address and where, in the image, the business appears relative the position of the camera that captured the image).

Landmark detector 102 may use any technique to identify businesses that appear in images, and to generate set 132 of correspondences between businesses and images. Some examples of those techniques are described below.

Figure 2:
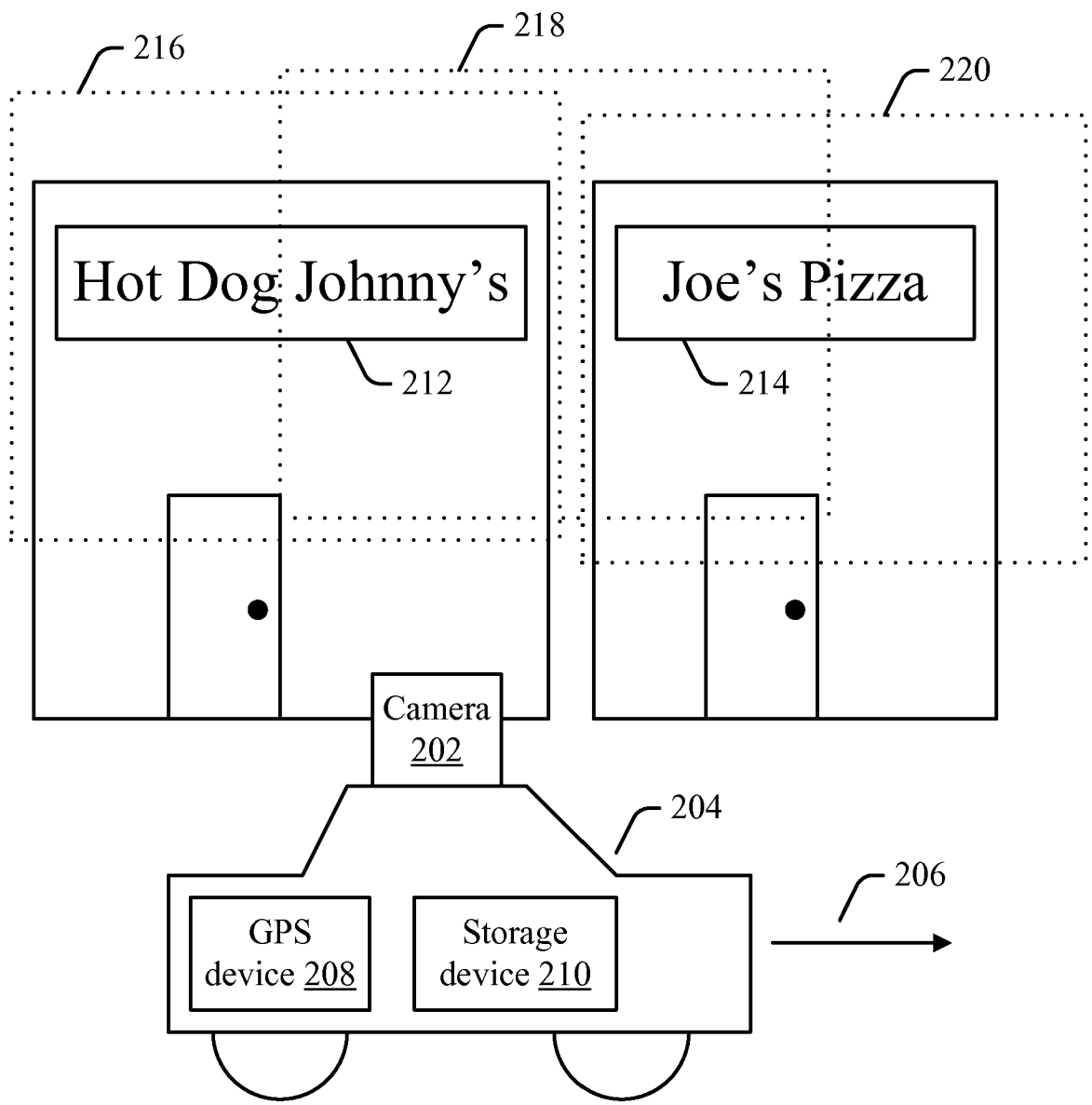
FIG. 2 is a block diagram of an example of image frames and of an apparatus that may be used to capture image frames.

As noted above, one type of input to landmark detector 102 is a set of image frames. In one example, image frames are captured at street level by a moving vehicle. FIG. 2 shows an example of image frames, and an apparatus that may be used to capture image frames.

In the example of FIG. 2, camera 202 (e.g., a digital camera) is mounted on vehicle 204. Vehicle 204 travels on a street in the direction indicated by arrow 206. As vehicle 204 travels, camera 202 captures images at street level. For example, camera 202 may be configured to capture images at some recurrent rate (e.g., once per second, once per half-second, etc.), or may capture images in response to some event (e.g., the camera may capture images when vehicle 204 is moving, and/or may raise or lower the rate of capture when vehicle 204 changes its speed of travel). In the example shown in FIG. 2, camera 202 captures images along the side of the street on which vehicle 204 travels by having its lens pointed in a direction perpendicular to the direction of travel. However, camera 202 could be oriented in any manner, and could capture any angle of view. For example, camera 202 might be a panoramic camera that captures a 360° view.

GPS device 208 may be used to determine the position of vehicle 204 at any given point in time. As camera 202 captures images, the image may be stored (e.g., in storage device 210) along with the geographic position of the camera at the time the image was captured.

FIG. 2 shows an example of a segment of a street, in which two businesses are visible, each indicated by a sign. Specifically, in this example, sign 212 identifies one business ("Hot Dog Johnny's"), and sign 214 identifies another business ("Joe's Pizza"). As vehicle 204 moves down the street, it captures various images 216, 218, and 220 in which signs 212 and 214 are visible. In this example image 216 captures all of the words in sign 212, image 218 captures some of the words in sign 212 and some of the words in sign 214, and image 220 captures all of sign 214. For each image, the position at which vehicle 204 was located when camera 202 captured the image may be recorded, along with the direction in which camera 202 was pointing when the image was captured. Thus, a landmark detector (such as that shown in FIG. 1) may receive a set of image frames showing some complete signs and some partial signs, and may attempt to deduce from that information what businesses are visible as landmarks when one drives down a particular street.

Figure 3A:
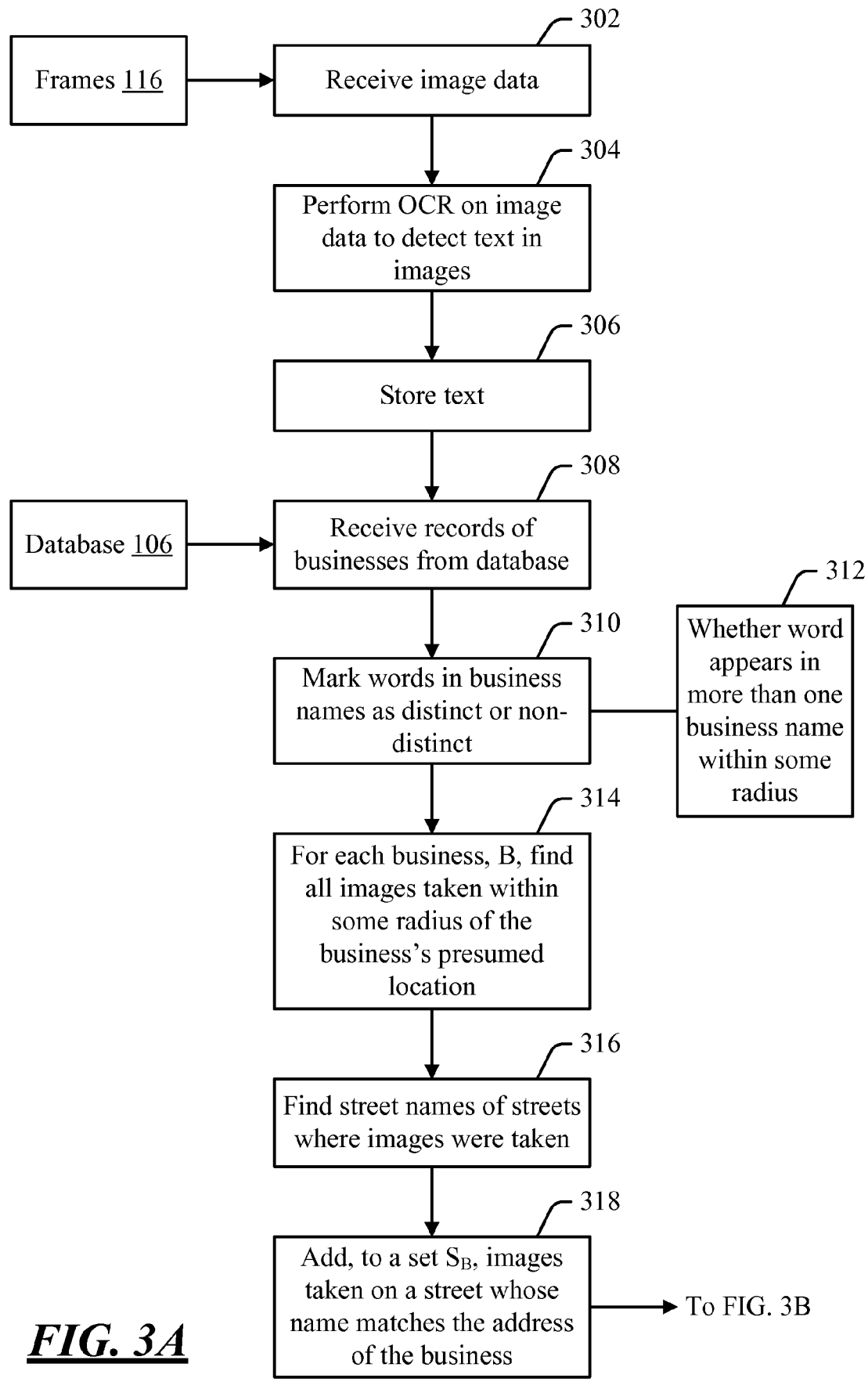
FIGS. 3A and 3B are, collectively, a flow diagram of an example process in which landmarks may be identified.
Figure 3B:
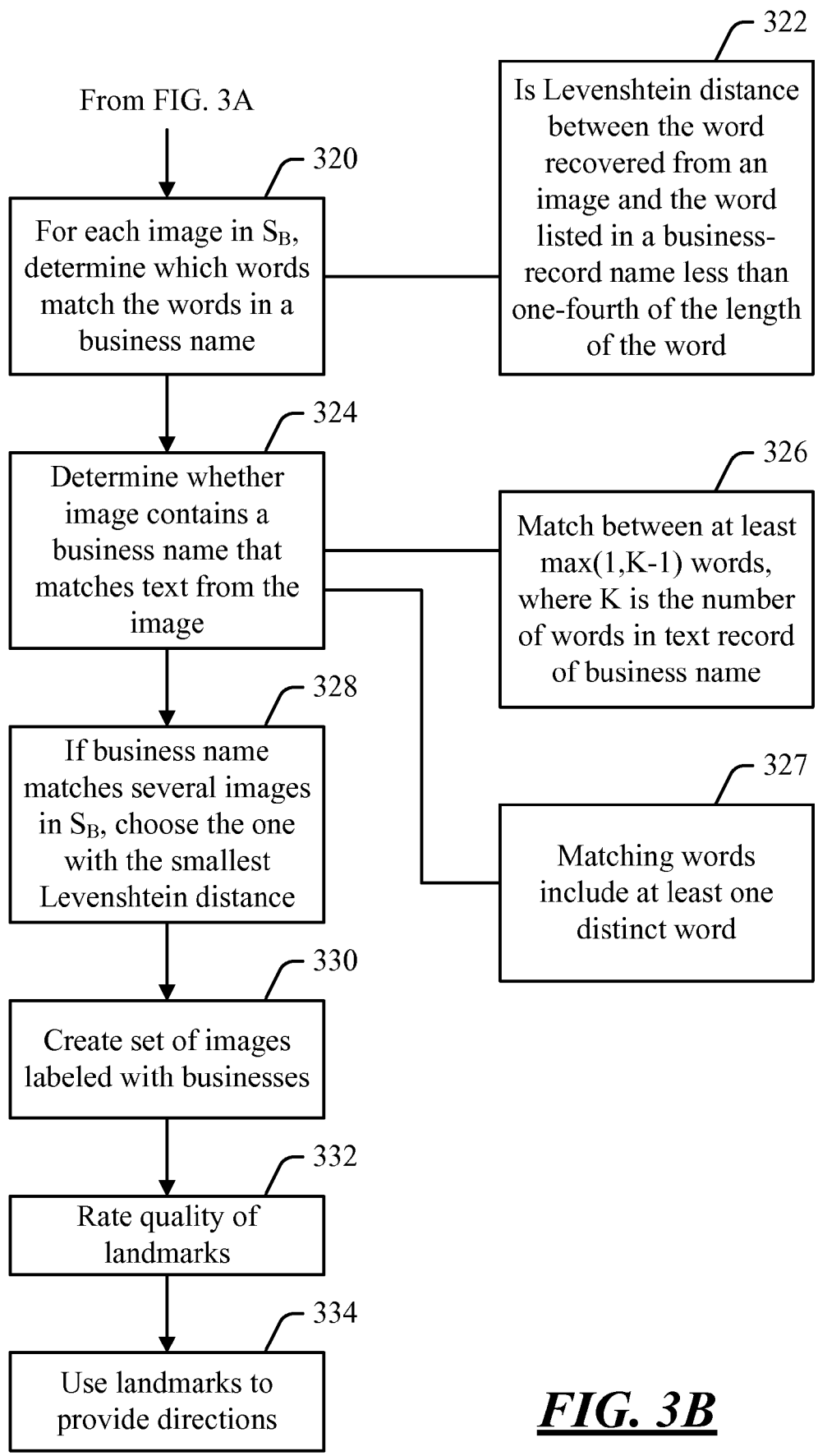

As noted above, data such as business records and images may be used to identify landmarks. FIGS. 3A and 3B collectively show an example process in which landmarks may be identified. Before turning to a description of FIGS. 3A and 3B, it is noted that these flow diagrams are described, by way of example, with reference to components shown in FIG. 1, although these processes may be carried out in any system and are not limited to the scenario shown in FIG. 1. Additionally, the flow diagram in FIGS. 3A and 3B shows an example in which stages of a process are carried out in a particular order, as indicated by the lines connecting the blocks, but the various stages shown in these diagrams may be performed in any order, or in any combination or sub-combination.

At 302, image data may be received. Image frames 116 (shown in FIG. 1) are an example of such image data. At 304, optical character recognition (OCR) may be performed on the image data to identify any words that appear in the images. Any OCR algorithm may be used to identify the words. Places that would serve as visible landmarks are typically identified by signs that have words, and thus the OCR process may identify the presence of such signs in an image. When capturing text from images, there is some risk that a captured word might appear on a moving object such as a vehicle, rather than on a fixed landmark—e.g., the words "Home Depot" might appear on a store of that name, or on a truck belonging to that store. Thus, images could be analyzed to distinguish words (or logos) that appear on businesses from words that appear on vehicles. This analysis could be performed in various ways—e.g., by recognizing vehicles in the images, by comparing images from different perspectives to determine whether the words appear to be on a building or on an object in the road, or by some other technique. At 306, any captured text may be stored.

At 308, business records may be received. For example, as described above in connection with FIG. 1, database 106 may store business records 104, which may indicate the name and address of business. Thus, at 308, such records may be retrieved from database 106.

At 310, the business records are examined, and words that appear in the business names are marked as distinct/non-distinct. In general, a word that is used in more than one business name is considered non-distinct, and a word that is used in only one business name is considered distinct. However, since it is likely that a given word is re-used in a business name somewhere in the world, one issue that arises is defining the geographic area that is to be examined when considering whether a word is used only once or more than once. In one example (shown in block 312), a circle of a particular radius is drawn around the presumed location of the business being considered (where the business's presumed location is where the business is inferred to be located based on its street address). So, if a business (e.g., "Joe's Pizza") is identified in the business records as being located at "123 Main Street", the approximate geographic location of that address may be determined, and all of the businesses that are less than some distance, D, from that location may be examined. If the word "Joe's" or "Pizza" appears anywhere in the name of businesses that are less than distance D away from the presumed location of "123 Main Street", then the words "Joe's" and "Pizza" may be considered non-distinct. Otherwise, either or both of these words may be considered distinct. For example, if a business named "Mark's Pizza" is found less than distance D away from Joe's Pizza, then "Pizza" would not be a distinct word (in the example shown in block 312). However, if the words "Joe's" is not found in any other business that is less than distance D away from Joe's Pizza, then "Joe's" would be considered a distinct word. Words might be normalized (e.g., through lemmatization), and distinctness might be evaluated by comparing the normalized forms of words. For example, the words "Joe" and "Joe's" might be treated as the same word for the purpose of determining distinctness, or they might be treated as different words.

At 314, for each business, B, listed in the business records, all of the images taken within some radius, R, of that business's presumed location are found. As noted above, a given business (or any entity with a street address) may have a presumed location derived from its street address, although—based on observation—it may subsequently be determined that the business (or other entity) is not located in exactly the place indicated by the street address. However, in determining the region in which to examine captured images, the presumed location of business B may be used as the center of a circle of radius R, and images captured inside that circle may be found at 314.

Figure 4:
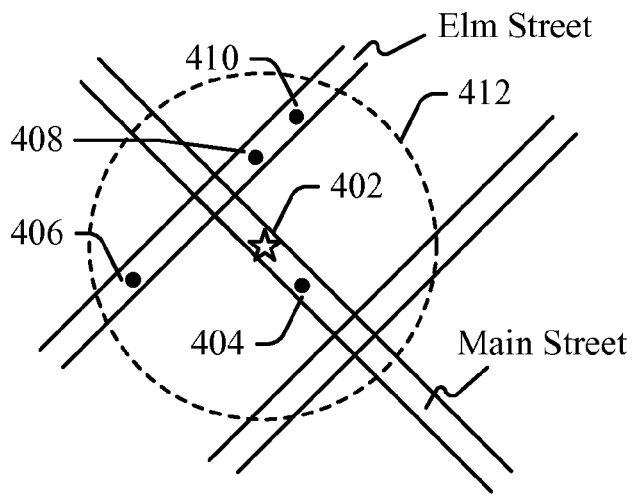
FIG. 4 is a diagram of streets, in which images are captured at various locations along the streets.

Next, at 316, the process finds the names of the streets where the images inside the circle were captured. For example, the geographic location at which the images were captured may be compared with map data to determine the street on which the image was captured. If the street on which the image was captured matches the street name of business B's address, then the image is added to a set $S_B$ (at 318). (A separate instance of set $S_B$ may be maintained for each business B.) For example, as shown in FIG. 4, business 402 is located along Main Street, and may have an address such as "123 Main Street" (as listed in a set of business records). Circle 412 is a circle, of some radius, that is centered at business 402. Images 404, 406, 408, and 410 were captured within the area bounded by circle 412. Image 404 was captured on Main Street, and images 406, 408, and 410 were captured on Elm Street. Since the address listed for business 402 is on Main Street, image 404 may be chosen for inclusion in set $S_B$.

Returning now to FIG. 3, At 320, for each image in $S_B$, a determination is made as to which words in the image match the words in the name of business B. Words captured through the OCR process mentioned above may have errors for various reasons such as fuzziness in the images, images being taken at odd angles, words cut off by the boundaries of the images, or limitations on the OCR algorithm. Therefore, the determination of whether words appearing in an image "match" the name of the business listed in a business record may include some level of tolerance for error. So various criteria may be applied to determine whether words match, and the matching criteria may allow for something other than an identical match. In one example (shown in block 322), the Levenshtein distance is calculated between a word in the image a word in the business's name. (The Levenshtein distance between two character strings is the minimal number of single-character insertions, deletions, and substitutions that it takes to convert one string into the other.) Then, with regard to the word that comes from the business record, the length of that word is found. If the Levenshtein distance is lower than one-fourth of the length of the word (or, alternatively, if the length of the word is more than four times the Levenshtein distance), then the words may be considered to match. In greater generality, the match could be determined based on a finding that the Levenshtein distance is less than some amount or quantity. Block 322 shows one way of determining whether a word in an image matches a word in a business record, although other criteria could be used to determine whether such a match exists.

At 324, it is determined whether an image contains a business name that matches text from the image. At 320 (described above), it was determined whether any individual words in the images in $S_B$ matched any words in business B's name. But, at 324, it is determined whether an image contains a match for the business name as a whole. This determination could be made in any way. One example way is to count how many words in an image match the words in a business name. In one example of this technique (which is shown in block 326), the number of words, K, in business B's name is counted, and a determination is made as to whether the number of words in an image that matches B's name is at least as many as max(1,K−1). In other words, if business B has one or two words in its name, then the image is said to contain B's name if the image has at least one word from B's name. Otherwise, if the image has three or more words (i.e., if K≧3), then the image is said to contain B's name image has matches for all of the words in B's name, or has matches for all but one of the words in B's name. Another criterion that may be imposed is whether the matching words include at least one distinct word (block 327). That is, in one example, a match might be found only if the text found in the image and the name of the business (as stated in a business record) contain at least one distinct word in common (where distinctness is described above).

After the determination at 324 is performed, if there is more than one image in $S_B$ that contains B's name, then one of these images may be chosen to represent B as a landmark. For example, the words in the various images may be compared with B's actual name, and the image whose words have the smallest Levenshtein distance to B's actual name may be chosen (at 328).

The analysis at 314-328 may be performed for each business B in a geographic region. After this analysis has been performed for a set of businesses, a set may be created (at 330) that contains the images that were found to show the businesses (or some subset of those images that were found to show the business), and each image may be labeled with the name (or other identifier) of the business(es) that the image shows.

At 332, the various businesses identified in images may be rated based on their perceived value as landmarks. In general, a business (or other entity) that is visible in an image may be presumed to be visible to a driver or other traveler, and thus such an entity may have some value as a navigation landmark. However, different entities may have different levels of value as landmarks based on factors such as visibility. At 334, the businesses that rate highly as landmarks may be used to provide directions.

Figure 5:
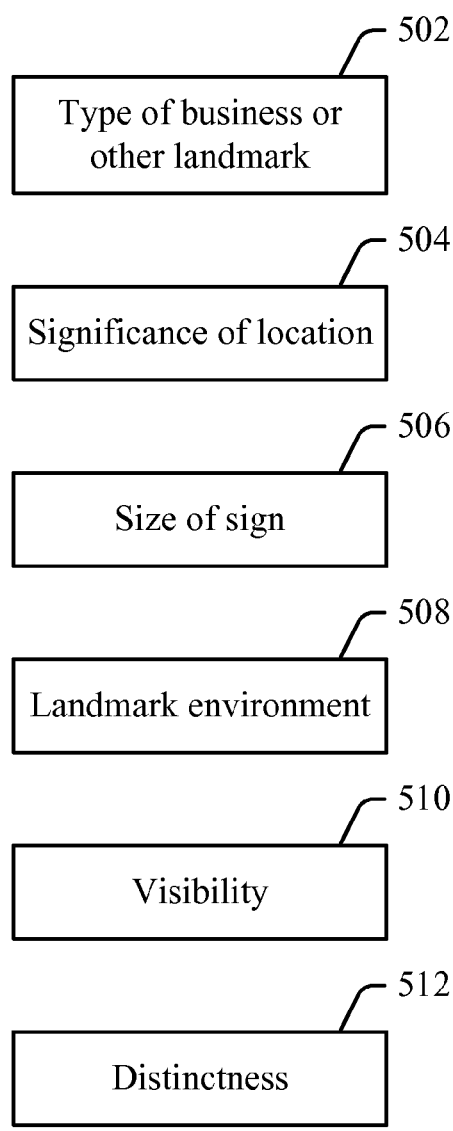
FIG. 5 is a block diagram of some example criteria that may be used to assess a particular business's (or other entity's) value as a landmark.

FIG. 5 shows some example criteria that may be used to assess a particular business's (or other entity's) value as a landmark.

One factor that may be considered in assessing a business's quality as a landmark is the type of business or landmark category (block 502). Some types of businesses may be more visually prominent to a driver, depending on the business's physical size and/or distinctness. For example, gas stations or franchises of big retail chains are usually located in big and isolated buildings that are easy to recognize and to view from the street. Additionally, large chain stores and restaurants tend to design their branches with uniform characteristics which may be particularly familiar and recognizable to a driver. Thus, a well-known business could have a high value as a landmark.

Another factor that could be considered in assessing a business's quality as a landmark is the significance of the business's location (block 504). Landmarks that lie near decision points may be of more significance to a driver than landmarks that lie along straight drive segments, since the driver may use the former to help him or her find a turn, while the latter may be used simply to assure the driver that he or she is still on the correct route.

Another factor that could be considered in assessing a business's quality as a landmark is the size of the sign associated with the business (block 506). In general, large signs are easier to see (and, therefore, may be more helpful as landmarks) than small signs. The size of the sign could be determined through analysis of images. Similarly, the contrast of the sign could be used to assess the level of visibility of the sign (and, therefore, the sign's quality as a landmark). For example, a sign written in black lettering on a white background would have more contrast than a sign written in pink lettering on a red background, so the black-on-white sign might be assessed as having a relatively higher quality as a landmark.

Another factor that could be considered in assessing a business's quality as a landmark is the environment surrounding the landmark (block 508). For example, a business that lies in a vicinity of many other businesses may be harder to spot than a smaller sign that stand by itself.

Another factor that could be considered in assessing a business's quality as a landmark is the visibility of the business's sign (block 510). For example analysis of images could reveal whether a sign is occluded from view by other objects (e.g., trees, buildings, etc.), or whether the sign can be seen from a long distance.

Another factor that could be considered in assessing a business's quality as a landmark is the distinctness of the business or its signage (block 512). For example, if there are several similar signs or similar-looking businesses along a route, then each of these businesses may have a relatively low value as a landmark. On the other hand, a business that has a sign or appearance that is readily distinguishable from other businesses in a given vicinity may have a relatively high value as a landmark.

Figure 6:
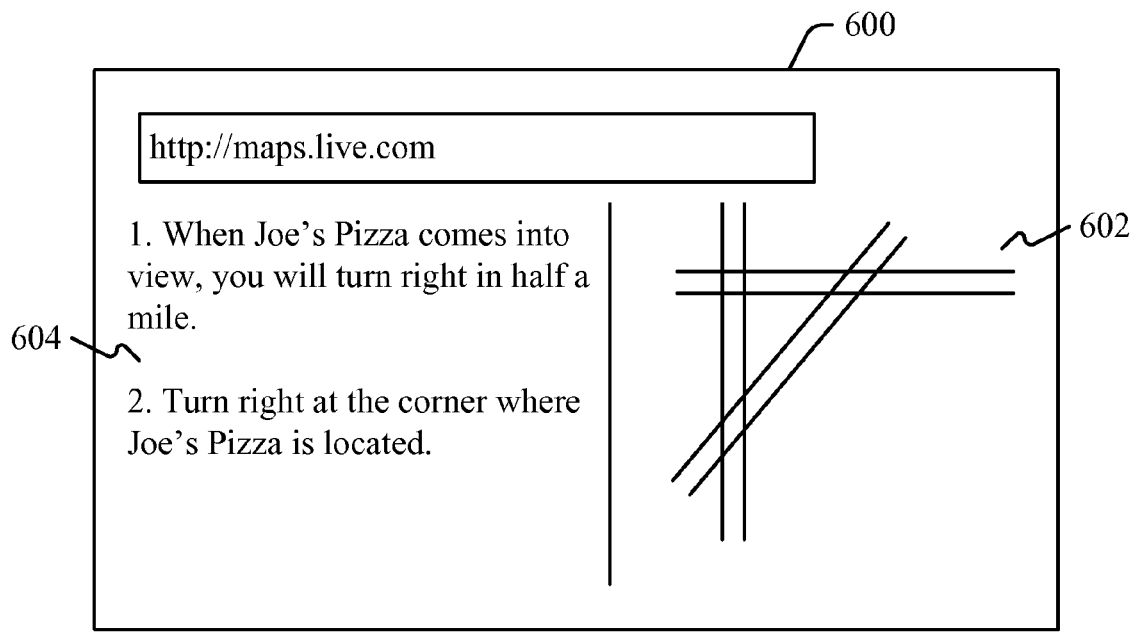
FIGS. 6 and 7 are block diagrams of example systems in which landmarks may be used to provide directions.
Figure 7:
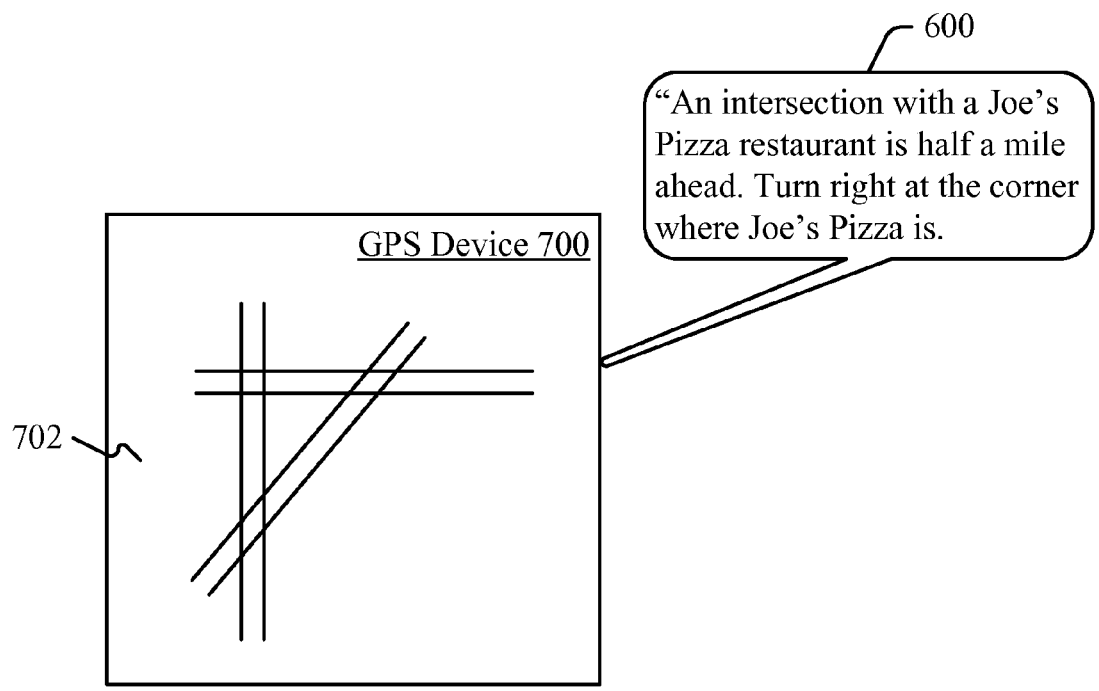

Once landmarks have been identified, the landmarks may be used in various ways. FIGS. 6 and 7 show some example ways in which landmarks may be incorporated into applications that provide directions to a person.

FIG. 6 shows an example application 600 that provides directions. Application 600 is a web application that a user accesses through a browser. The user may request directions from one point to another, and application 600 may provide directions between those points. In order to provide directions, application 600 may provide various guides, such as a map 602 of the route to be followed, and textual directions 604 indicating which streets a driver (or other traveler) is to follow and where to turn. Landmarks may be incorporated into these guides. For example, images of specific landmarks could be added to the map, showing where they appear along the route. Thus, if the directions say to turn right at an intersection and there is a restaurant called "Joe's Pizza" at the intersection, an image of the restaurant could be shown in an appropriate place in map 602. As another example, the existence of the restaurant could be incorporated into textual directions 604 as shown in FIG. 6 (e.g., "When Joe's Pizza comes into view, you will turn right in half a mile").

FIG. 7 shows another example application that provides directions. The application in FIG. 7 is part of a GPS device 700 (e.g., an automobile navigation system of the built-in or portable variety). GPS device 700 may provide a map 702 showing a route between two points, and images of landmarks may be incorporated into map 702. As another example, GPS device 700 may provide spoken directions 704, and landmarks could be incorporated into the spoken directions. FIG. 7 shows an example in which Joe's Pizza is a landmark, which is incorporated into spoken directions 704 in order to help a driver find a turn.

In addition to the examples discussed above, landmarks could be used in other ways. For example, since a route with landmarks may be easier to follow than one without landmarks, an application that provides directions could choose a route based on the existence and/or quality of landmarks along that route—e.g., by favoring a route that has high quality landmarks at decision points along the route.

Figure 8:
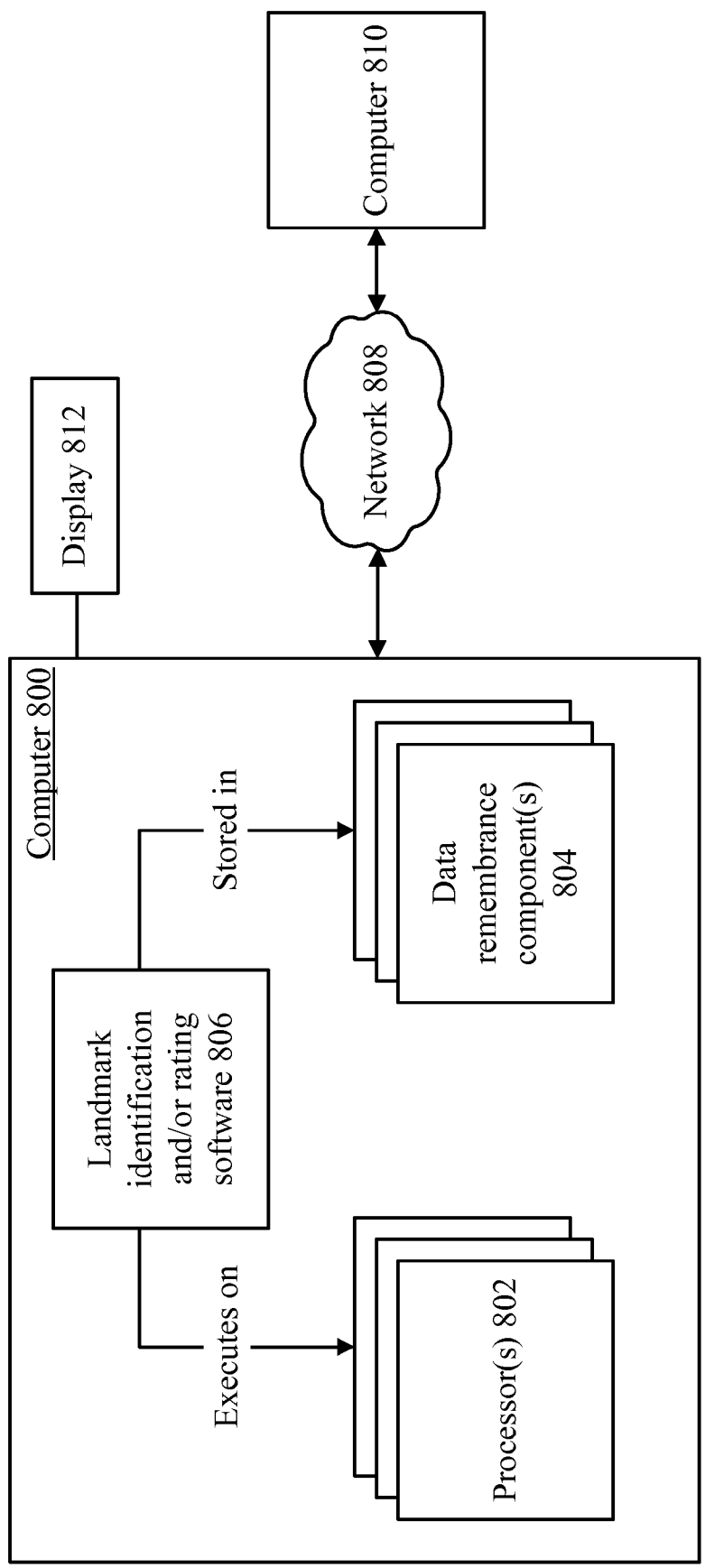
FIG. 8 is a block diagram of example components that may be used in connection with implementations of the subject matter described herein.

FIG. 8 shows an example environment in which aspects of the subject matter described herein may be deployed.

Computer 800 includes one or more processors 802 and one or more data remembrance components 804. Processor(s) 802 are typically microprocessors, such as those found in a personal desktop or laptop computer, a server, a handheld computer, or another kind of computing device. Data remembrance component(s) 804 are components that are capable of storing data for either the short or long term. Examples of data remembrance component(s) 804 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 800 may comprise, or be associated with, display 812, which may be a cathode ray tube (CRT) monitor, a liquid crystal display (LCD) monitor, or any other type of monitor.

Software may be stored in the data remembrance component(s) 804, and may execute on the one or more processor(s) 802. An example of such software is landmark identification and/or rating software 806, which may implement some or all of the functionality described above in connection with FIGS. 1-7, although any type of software could be used. Software 806 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 8, although the subject matter described herein is not limited to this example.

The subject matter described herein can be implemented as software that is stored in one or more of the data remembrance component(s) 804 and that executes on one or more of the processor(s) 802. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 802) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 800 may be communicatively connected to one or more other devices through network 808. Computer 810, which may be similar in structure to computer 800, is an example of a device that can be connected to computer 800, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions that, when executed by a computer, cause the computer to perform acts comprising:
    receiving a record that comprises a name of an entity and a street address of said entity;
    receiving a plurality of images;
    identifying a set of said images that were captured within a first distance of a location of said entity, said location being determined from said street address;
    performing a character recognition process on said set of images to identify words that appear in said set of images;

comparing said words to said name;
determining, based on comparison of said words with said name that said entity appears in an image that is in said set of set of images; and
providing directions to a person, wherein said directions include said entity as a landmark;
said comparing comprising:
calculating Levenshtein distances between words in said set of images and words in said name; and
determining that one of said Levenshtein distances is less that a quantity.

2. The one or more computer-readable storage media of claim 1, wherein said comparing further comprises:
determining how many words in one image in said set match a number of words in said name.

3. The one or more computer-readable storage media of claim 1, wherein said comparing further comprises:
determining which words in one image in said set are not found within said first distance of said location of said entity; and
determining that one of the words in one image in said set, that are not found within said first distance of said location of said entity, matches one of the words in said name.

4. The one or more computer-readable storage media of claim 1, further comprising:
determining which of said images in said set contains words that have a smallest Levenshtein distance to said name.

5. The one or more computer-readable storage media of claim 1, further comprising:
determining which images in said set were captured from a street whose name matches a street that is part of said street address.

6. The one or more computer-readable storage media of claim 1, further comprising:
rating said entity's quality as a landmark based on one or more criteria.

7. A system for assessing landmarks, the system comprising:
a database that stores records of entities, said records identifying names and addresses of said entities;
a landmark detector that receives a record of an entity that is one of said entities, and that further receives a plurality of images, said landmark detector identifying, based on geographic locations at which said images were captured, which of said images were captured within a distance from said entity, said landmark detector identifying words that appear in each of said images, said landmark detector determining, based on a comparison of words in said images with words in a name of said entity, which of said images said entity appears in, said landmark detector rating said entity's quality as a landmark based on one or more criteria, said landmark detector determining that one of said images contains a first word that appears in a name of said entity by calculating a Levenshtein distance between words in said name and said first word, and by determining that said Levenshtein distance is lower than an amount; and
a navigation application that provides directions using said entity as a landmark, said navigation application choosing said entity as a landmark based on said entity's quality as a landmark as rated by said landmark detector.

8. The system of claim 7, wherein said landmark detector rates said entity's quality as a landmark based on said entity being a particular type of business.

9. The system of claim 7, wherein said landmark detector rates said entity's quality as a landmark based on said entity being at or near an intersection.

10. The system of claim 7, wherein said landmark detector rates said entity's quality as a landmark based on a size of a sign that appears with said entity, as determined from one of said images.

11. The system of claim 7, wherein said landmark detector rates said entity's quality as a landmark based on visibility of said entity as determined from analysis of one of said images.

12. The system of claim 7, wherein said landmark detector rates said entity's qualities as a landmark based on a name of said entity having a first word that is distinct in that said first word appears in a sign associated with said entity and that does not appear in any other sign within said distance from said entity.

13. The system of claim 7, wherein said application comprises a web application that provides maps and directions.

14. The system of claim 7, further comprising:
an automobile navigation device, said application being part of said automobile navigation device.

15. A method of using landmarks in directions, the method comprising:
using a processor to perform acts comprising:
receiving a plurality of image frames, each of said image frames comprising an image and a location at which said image was captured;
receiving a first set of records, each of said records comprising a name of an entity and a street address of said entity;
identifying a second set of said plurality of image frames that were captured within a distance of a street address of a first entity, said first entity being included in said first set of records;
determining which images in the images frames in said second set were captured on a street that matches said street address, the images captured on a street that matches said street address being in a third set;
determining that a first one of the images in said third set contains words that match a name of said first entity;
calculating Levenshtein distances between words in a name of said first entity and words in a fourth set of words that appear in said first one of the images;
based on one of said Levenshtein distances being lower than an amount, determining that said first entity appears in said first one of the images; and
providing directions from a first point to a second point, said directions including, as a landmark, said first entity.

16. The method of claim 15, further comprising:
using a processor to perform acts comprising:
identifying a word in a name of said first entity that does not appear in a name of any entity located within a distance from said first entity;
determining that said first one of said images contains said word.

17. The method of claim 15, further comprising:
using a processor to perform acts comprising:
identifying a fourth set of words that appear in said first one of the images in said third set;
determining that said fourth set contains either all of the words in a name of said first entity or all but one of the words in the name of said first entity.

* * * * *